(12) United States Patent
Louis et al.

(10) Patent No.: US 6,701,967 B2
(45) Date of Patent: *Mar. 9, 2004

(54) DEVICE HAVING A RADIAL PARTITION IN A DOUBLE WALLED PIPE INTENDED FOR GREAT DEPTHS

(75) Inventors: Bill George Louis, Houston, TX (US); Mike Bell, Aberdeen (GB)

(73) Assignee: Coflexip (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/280,932

(22) Filed: Oct. 24, 2002

(65) Prior Publication Data

US 2003/0047227 A1 Mar. 13, 2003

Related U.S. Application Data

(62) Division of application No. 09/768,634, filed on Jan. 24, 2001, now Pat. No. 6,513,551.

(30) Foreign Application Priority Data

Jan. 24, 2000 (FR) .............................. 00 00849

(51) Int. Cl.[7] ................................................ F16L 55/00
(52) U.S. Cl. ....................... 138/108; 138/109; 138/112; 138/114; 138/148; 285/123.15
(58) Field of Search ................. 138/108, 109, 138/112, 114, 148; 285/50, 123.3, 123.15, 124.2

(56) References Cited

U.S. PATENT DOCUMENTS

| | | | | |
|---|---|---|---|---|
| 504,871 A | * | 9/1893 | Forsyth | 138/148 |
| 3,109,671 A | * | 11/1963 | Braun | 285/123.3 |
| 3,928,903 A | * | 12/1975 | Richardson et al. | 138/113 |
| 3,943,618 A | * | 3/1976 | Perkins | 285/47 |
| 4,108,476 A | * | 8/1978 | Krupp | 285/47 |
| 4,699,177 A | * | 10/1987 | Thomas | 138/103 |
| 4,724,750 A | * | 2/1988 | Coleman et al. | 138/112 |
| 4,786,088 A | * | 11/1988 | Ziu | 138/113 |
| 5,085,471 A | * | 2/1992 | Ziu | 285/133.1 |
| 5,141,260 A | * | 8/1992 | Burwell | 285/133.1 |
| 5,186,502 A | * | 2/1993 | Martin | 138/112 |
| 5,400,828 A | * | 3/1995 | Ziu et al. | 138/113 |
| 5,402,831 A | * | 4/1995 | Hollis | 138/113 |
| 6,513,551 B2 | * | 2/2003 | Louis et al. | 138/108 |

* cited by examiner

*Primary Examiner*—James Hook
(74) *Attorney, Agent, or Firm*—Ostrolenk, Faber, Gerb & Soffen, LLP

(57) ABSTRACT

A device for arresting the propagation of a buckle appearing on an outer tube of a double-walled rigid pipe intended to transport hydrocarbons and consisting of two coaxial tubes. The double-walled pipe is of the reelable type and intended for very great depths and consists of a thick and rigid annular transverse partition fastened to the inner tube and to the outer tube. The partition is joined to the outer tube and to the inner tube by way of an outer and inner sleeve having the same diameter as the outer and inner tubes and fastened to the latter.

12 Claims, 3 Drawing Sheets

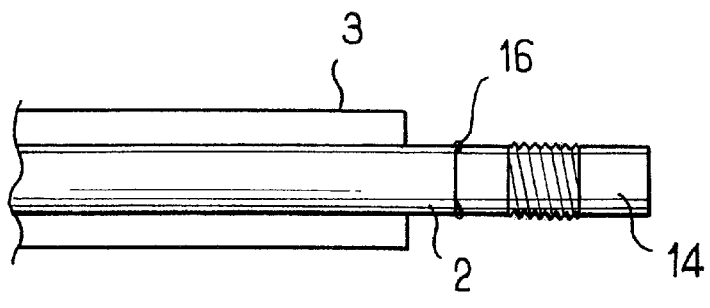
FIG_2
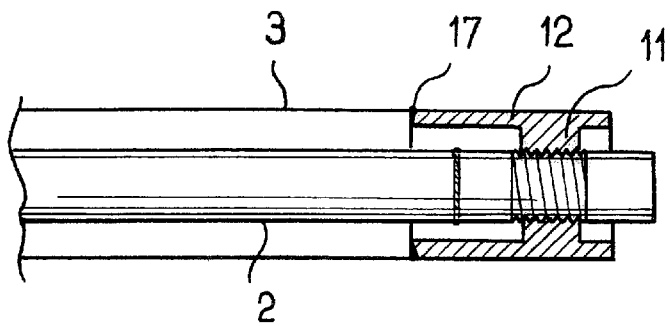
FIG_3
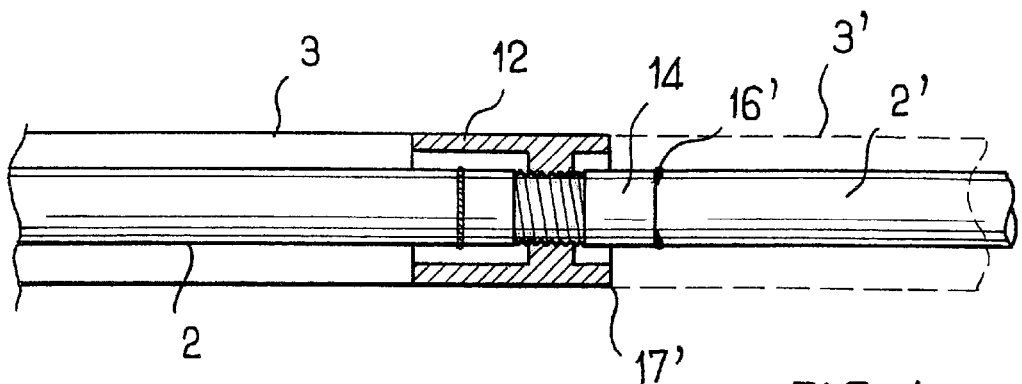
FIG_4

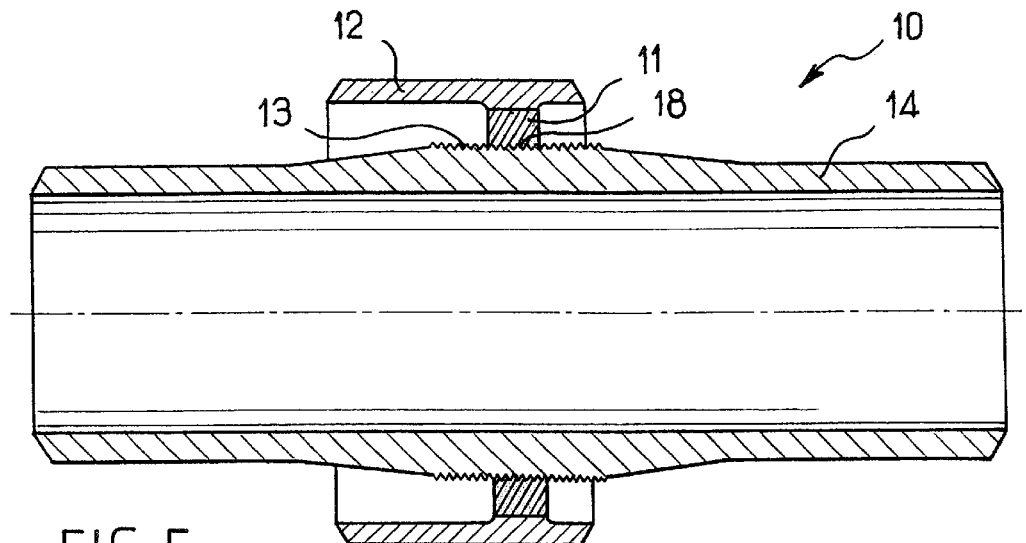
FIG_5
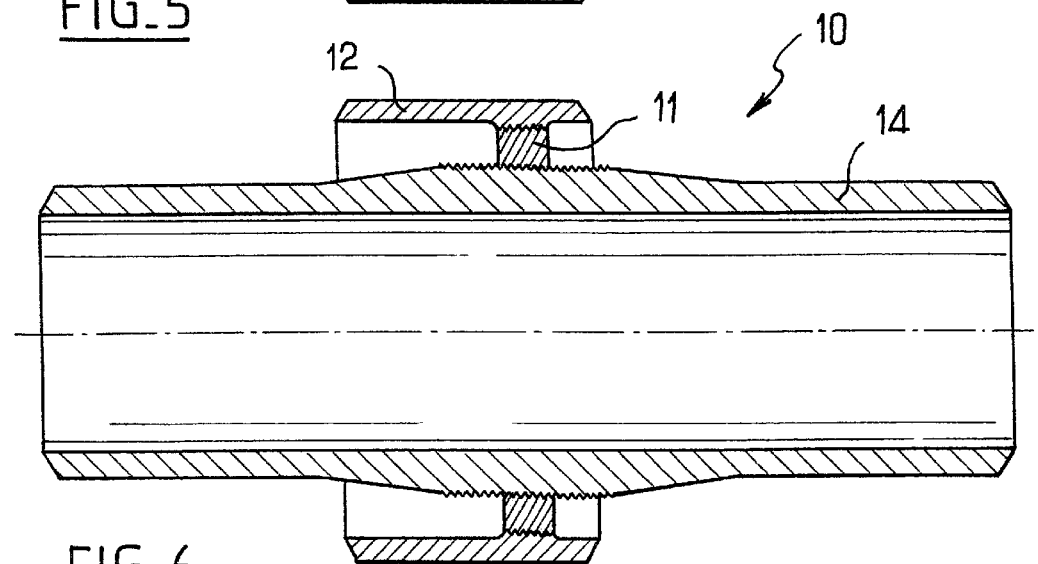
FIG_6
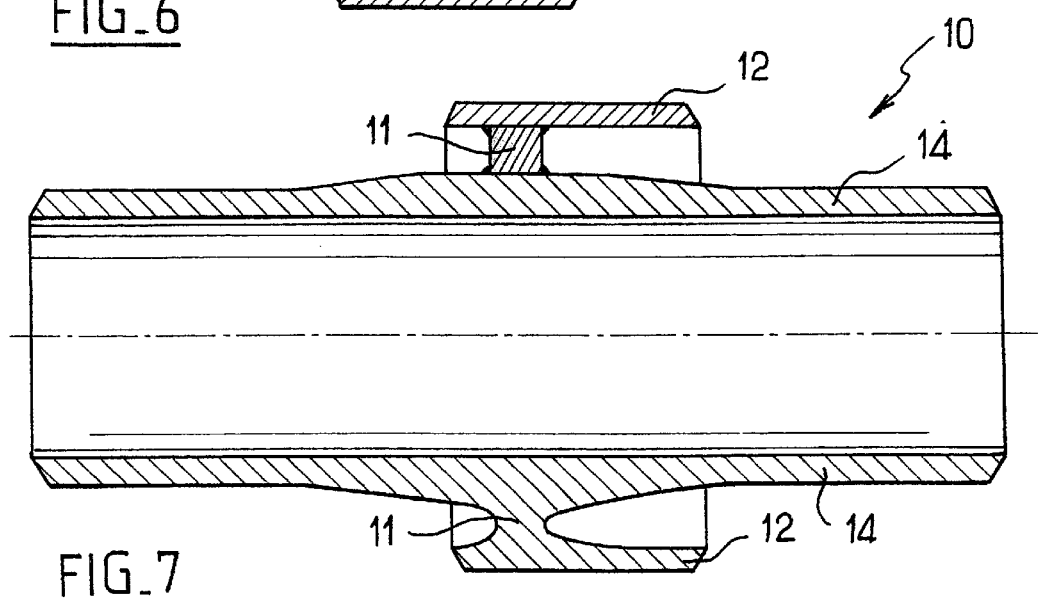
FIG_7

DEVICE HAVING A RADIAL PARTITION IN A DOUBLE WALLED PIPE INTENDED FOR GREAT DEPTHS

CROSS REFERENCE TO RELATED APPLICATION

This is a divisional of U.S. patent application Ser. No. 09/768,634, filed Jan. 24, 2001, now U.S. Pat. No. 6,513,551 in the name of Bill G. LOUIS and Mike BELL and entitled DEVICE HAVING A RADIAL PARTITION, ESPECIALLY FOR ARRESTING THE PROPAGATION OF A RADIAL BUCKLE IN A DOUBLE-WALLED PIPE INTENDED FOR GREAT DEPTHS.

BACKGROUND OF THE INVENTION

1. Field of the Invention

The present invention relates to a device having a radial partition, especially for arresting the propagation of a radial buckle in a double-walled pipe consisting of two, respectively inner and outer, coaxial metal tubes separated by an annular space, this pipe being a rigid pipe for transporting fluids such as hydrocarbons, and intended for very greater depths.

2. Relevant Art

A rigid pipe or tube is laid on the seabed usually from a so-called pipelaying gauge. The laying is called S-laying when the pipe adopts the shape of an S between the pipelaying gauge and the seabed and it is called J-laying when the pipe adopts the shape of a J. In the latter case, a guide ramp is provided on the pipelaying gauge, which ramp may sometimes be partially immersed in the water.

The rigid pipe to be laid is stored on the pipelaying gauge either in pipe sections of a given but relatively short length, the pipe sections being joined together as the laying progresses, or it is wound as a great length on a reel, the pipe then being unreeled from the reel during the laying operation. These laying operations are described in the API (American Petroleum Institute) document "Recommended Practice 17 A" from 1987.

When the pipe has left the gauge and while the pipe is being laid, it is important that the latter undergoes no plastic deformation in bending, which would result in ovalization of the pipe causing a "week singularity" which would be conductive to the initiation of a collapse. Moreover, when the pipe is laid on the seabed at great water depths (typically greater than 300 m and possibly up to 2000 m and more), the hydrostatic pressure exerted on the pipe may be sufficient to initiate a radial buckle which has a tendency to propagate as a wave along the pipe, in both directions. Of course, the buckle will form preferentially at a "weak singularity" when one exists on the pipe. When the buckle occurs, it is then necessary to replace at least that section or portion of the pipe comprising the buckled or collapsed region. The buckle propagation pressure is given by the formula:

$$26 \times \sigma_0 \times (T/D)^{2.5}$$

where $\sigma_0$ is the yield stress of the steel, T is the thickness of the pipe and D is the external diameter of the pipe. To resist the propagation of a buckle, the corresponding pressure must be greater than the hydrostatic pressure.

To prevent the propagation of a local buckle or local buckles, it has been proposed to provide the pipe with certain devices or means, called buckle arrestors. The API Recommended Practice 1111 gives various recommendations and formulae which indicate from which depth the arrestors are recommended, necessary or strictly indispensable.

Such devices are firstly proposed within the context of single-walled rigid pipes.

According to a first solution, a cylinder is placed inside the pipe. Thus, it is proposed in U.S. Pat. No. 3,747,356 to link a cylinder to a cable, to lodge the cylinder inside a pipe section and then to simultaneously unreel the pipe and the cable so as to keep the cylinder in the pipe section while the latter is being laid, until the pipe comes into contact with the seabed. The cylinder is then brought back up so as to be lodged in another pipe section to be laid, which is joined to the previous section. Consequently, any buckle likely to occur, when laying the pipe, between the pipelaying gauge and the seabed is immediately arrested and therefore not allowed to propagate along the pipe sections. However, such an arrangement provides no solution or effectiveness for arresting buckles likely to be propagated after the pipe has been finally laid on the seabed.

According to a second solution, an inner, or preferably outer, reinforcing collar (possibly in two parts, constituting a "clamp") is used. Thus, in U.S. Pat. No. 3,768,269, it is proposed to locally increase the stiffness of the pipe by placing, at regular intervals, for example at intervals ranging between 100 m and 500 m, reinforcing collars whose length ranges between 1 m and 2.5 m. Such a solution is valid only for pipes laid in sections since the reinforcing collars can be mounted and fastened in the factory to the pipe sections and then transported by the pipelaying gauge to the laying site. When the pipe is long and would onto a storage reel, it then becomes virtually impossible to wind the pipe with its reinforcing collars onto a reel since they would result in straight or almost straight portions that cannot be deformed when winding the pipe onto the storage reel. In order to mitigate this difficulty, it is conceivable to mount and fasten the reinforcing collars during the laying operations. However, it would then be necessary to interrupt the laying, at regular intervals, so as to mount and fasten the reinforcing collars. According to an alternative solution known through this same patent or through documents GB 1,383,527 or U.S. Pat. No. 5,458,441, the localized reinforcement may take the form of a thicker intermediate sleeve welded to the ends of the pipe.

According to a third solution, a spiralled rod is used on the external wall of the pipe. Thus, to allow the pipe to be wound onto a reel, U.S. Pat. No. 4,364,692 proposes to wind a rod tightly around the pipe so as to form a certain number of turns which can be welded at their ends to the rod itself and/or to the pipe.

According to another embodiment, the turns may be individual turns, by welding their two ends and regularly spacing them apart along that portion of the pipe to be reinforced. As long as the pipe is a single-walled pipe, the increase in the diameter in the reinforced portions may be acceptable. However, when the pipe is of the double-walled or pipe-in-pipe type, that is to say comprising an external tube or liner pipe which is slipped over the internal tube, the increase in the diameter of the liner tube is unacceptable when transporting and storing long lengths of double-walled pipe.

In addition, when the rigid pipe to be laid is manufactured in long lengths on land and then wound onto a reel on the pipelaying gauge, the solutions recommended in the aforementioned documents are not appropriate as they use either long reinforcing collars, having a length of about 1 to 2.5 m, as in U.S. Pat. No. 3,768,209, or the winding of a reinforcing rod around the rigid pipe, as in U.S. Pat. No. 4,364,692.

For the purpose of solving these problems and of obtaining double-walled pipes that can be wound, despite the propagation arrestors, the Applicant has already proposed particular devices.

According to Application FR 99/08540, a portion of flexible pipe is welded to the internal wall of the external tube in order to form a flexible propagation arrestor.

According to Application FR 99/15216, the propagation arrestor consists of an annular compartment filled with resin which is injected before or during the laying and which can be cured only after the laying if the length of the compartment for the resin is too great to allow winding in the cured state.

In the field of double-walled metal pipes, devices of various kinds are known which are placed between the inner and outer coaxial tubes and which are not intended to arrest the propagation of a buckle, but rather to form compartments, to serve as a spacer or to join several sections of pipe together. For example, end-blocking systems, or bulkheads, for double-walled rigid pipes exist and are described especially in WO 96/36831 and WO 98/17940. Such bulkheads cannot be likened to propagation arrestors since the elastic material from which they are produced is not capable of transferring the stresses applied to the external tube on the internal tube.

Also known in a very different field, that of double-walled thermoplastic pipe assemblies, for example from documents U.S. Pat. Nos. 5,141,260 and 4,786,088, are radial-partition spacers between the two walls which make it possible to prevent the problems associated with the differential expansion of the two walls, which may cause axial distortions that these spacers can contain. These pipe assemblies are not intended to be submerged nor to be exposed to a surrounding pressure of the kind to induce radial buckling phenomena. Nor are these pipe assemblies intended to be wound.

It is apparent from this prior art that it is known, especially thanks to the Applicant, to have propagation arrestor devices on double-walled metal pipes which remain reelable, but at the cost of degree of structural complication and therefore an increase in the cost.

SUMMARY OF THE INVENTION

The objective of the invention is to provide a propagation arrestor device for a reelable double-walled pipe, which is simple to manufacture and to fit.

The objective of the invention is achieve within the framework of a reelable double-walled metal pipe because the arrestor device consists of a thick and rigid annular transverse partition fastened to the inner tube and to the outer tube.

A solution is all the more surprising as it is particularly simple but has never been considered, despite the constant need in the oil industry, this need being all the more pressing since operations in deeper and deeper water make the propagation arrestors absolutely indispensable.

A thick and rigid annular transverse partition has already been known per se for a very long time, for example from the already-mentioned document U.S. Pat. No. 3,768,269, but this involved only a collar external to the single pipe and which therefore did not prevent the pipe from being reeled.

The thickness of the partition according to the invention is typically less than 0.5 times the outside diameter of the pipe, unlike the arrestors for a double-walled pipe that have been known hitherto. The thickness is even preferably less than 0.2 times the outside diameter.

In one embodiment, the partition is joined to the outer tube and/or to the inner tube by means of a sleeve having approximately the same diameter as the said outer and/or inner tube and fastened to the latter. Advantageously, the device has a half cross section in the form of an elongate H. To avoid certain difficulties when inspecting the in situ welds, it may be made of steel, for example as a single casting, and may be welded to the ends of the tubes of the pipe.

The fastening of the partition and/or the sleeve to the tubes may be done by welding, adhesive bonding or even screwing.

When winding onto the reel, the inner tube will be subjected to a very high local stress at the partition. This phenomenon, which might possibly result in the creation of cracks in the inner tube, may be combated by gradually and locally increasing the thickness of the inner tube in the region provided for the partition.

The pipe according to the invention can be used at great depths, without other forms of propagation arrestors than those above, and without any modification of the pipe (such as increasing the thickness of the outer tube).

Another aspect of the invention provides a device with a radial partition for a rigid double-walled pipe or tube for transporting hydrocarbons, the said pipe consisting of two, respectively inner and outer coaxial metal tubes separated by an annular space, this pipe being intended for very great depths, characterized in that it consists of a thick and rigid annular transverse partition joining an outer metal sleeve to an inner metal sleeve of the same diameter as the said outer tube and the said inner tube respectively, these sleeves being designed to be welded to the inner tube and to the outer tube respectively, connection between the inner sleeve and the outer sleeve being provided by screwing.

Advantageously, the inner sleeve is offset axially with respect to the outer sleeve (that is to say the inner sleeve extends beyond the outer sleeve on one side and is set back on the other), so as to facilitate the laying by welding, by limiting the number of welds. This partitioning device is particularly advantageous for rigid pipes which are not wound and are assembled offshore, since it reduces the manufacturing time. It gets round the problem of intermediate pieces which are needed for a partition device in the form of a single piece or in the form of two pieces which are welded together, and it also has the advantage of allowing the position of the external tube to be easily adjusted with respect to the internal tube, obviating manufacturing clearances.

BRIEF DESCRIPTION OF THE DRAWINGS

Further advantages and features will become more apparent on reading the following description of the invention, with reference to the appended drawings in which:

FIGS. 2, 3 and 4 show schematically, in cross section, three steps of fitting the device of the invention during the manufacture of the pipe;

FIGS. 5 and 6 show, in longitudinal cross section, two other embodiments of the propagation arrestor of the invention;

FIG. 7 shows, in two longitudinal half-cross sections, two variants of the device in FIG. 1.

DETAILED DESCRIPTION OF THE PREFERRED EMBODIMENT

Figure 1:
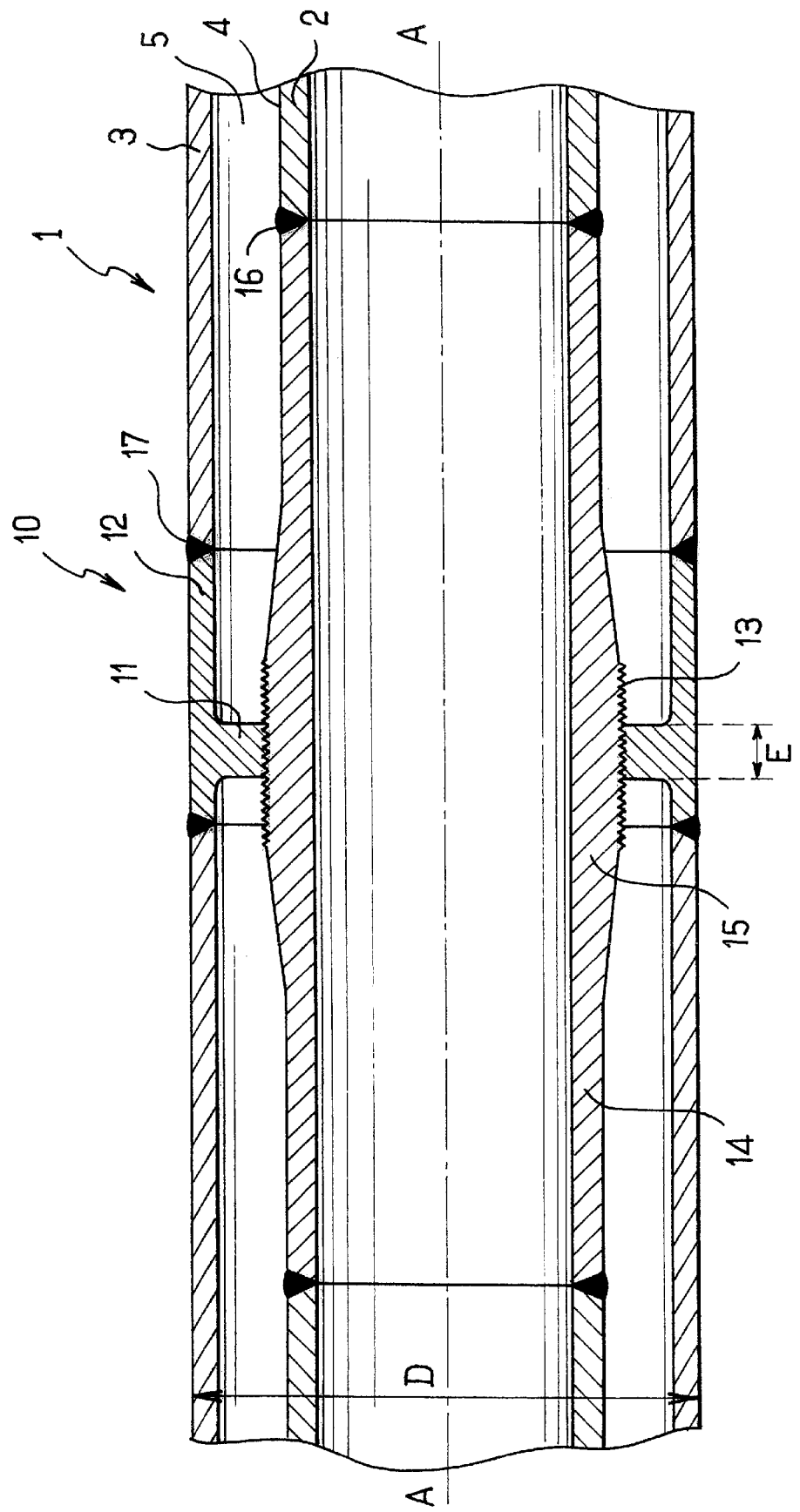
FIG. 1 is a longitudinal cross-sectional view of a portion of a double-walled rigid pipe fitted with a propagation arrestor device according to the invention.

The double-walled rigid pipe 1 of longitudinal axis A, shown partially in FIG. 1, comprises an inner wall or tube 2

(the "flow pipe"), the diameter and the nature of the material of which are chosen according to the fluid flowing in the said inner tube, especially according to the temperature and pressure of the said fluid, and an outer wall or tube 3 (the "carrier pipe") which is slipped over the inner tube 2. The outer tube 3 generally has an outside diameter D which is larger in dimensions than the inner tube 2 in order to allow a thermal insulation to be placed in the annular space 5 and has a thickness which makes it possible to withstand the hydrostatic pressure which is exerted on the said outer tube 3. The rigid pipe 1 generally includes spacers (not shown) which are fastened to the external wall 4 of the inner tube 2 and which are lodged in the annular space 5 provided between the outer tube 3 and the inner tube 2.

The propagation arrestor device 10 essentially comprises an annular partition 11 fastened to the tubes 2 and 3. The thickness E of the partition is quite small compared with the diameter D, for example about 1 to 2 tenths of D. In one embodiment, E=30 mm and D=270 mm.

The partition 11 is a piece with a short outer sleeve, approximately having the same thickness and the same diameter as the outer tube 3. The partition 11 is screwed onto an external thread 13 of an inner sleeve 14 having approximately the same thickness and the same diameter as the inner tube 2. However, the thread 13 is provided in the middle of a region 15 of the sleeve, the thickness of which gradually increases towards the outside and towards the middle. The sleeves 12 and 14 are fastened to the inner 2 and outer 3 tubes by welds 16 and 17. The thread 13 is advantageously an ACME-type thread (a trapezoidal thread) widely used in the oil sector for joining sections of pipe and allowing good load transfer. The thread 13 may be placed on any part of the partition 11, not necessarily at the point where it is joined to one or other of the sleeves.

Preferably, the inner sleeve 14 and the outer sleeve 12 are offset axially (for example by 100 mm) in order to facilitate the fitting which will now be explained in FIGS. 2 to 4. The double-walled pipe is manufactured in a known manner by joining a section of a certain length (for example 12 m). When an arrestor has to be interposed, approximately every 200 m of pipe, the process starts by welding, at 16, the threaded inner sleeve 14 to the inner tube 2 (FIG. 2); the assembly consisting of the partition 11 and the outer sleeve 12 is screwed thereon and the outer sleeve 12 is welded at 17 to the outer tube 3.

Since the outer sleeve 12 is offset with respect to the inner sleeve 14, it is not necessary to use an intermediate tube (two half-shells) in order to joint the outer sleeve 12 to the outer tube 3. It will be clearly understood that, when the device consists of a single piece or of several welded pieces, an intermediate tube will be necessary, the external sleeve 12 being shorter than the internal sleeve 14 in order to allow the internal sleeve 14 to be welded to the inner tube 2. In addition, the screwed device allows optimum adjustment of the position of the outer sleeve 12 with respect to the outer tube and therefore makes it possible to take up any manufacturing clearances.

The partition may also be welded at the thread in order to ensure leaktightness, this weld not having to take the loads and therefore being simple to produce. Next, the inner tube 2' of a new section of pipe is pulled out, by releasing it from the outer tube, by an amount long enough to allow it to be welded at 16' to the inner sleeve 14 of the arrester fitted (FIG. 4), the outer tube 3' (shown in dotted lines) of the new section is then pulled back over the inner tube 2' just welded, in order to weld it at 17' to the outer sleeve 12, and the process may continue with the conventional manufacture of several sections of pipe until the next propagation arrester is fitted.

The arrestor described above is made entirely of steel (possibly in different grades for the inner sleeve and for the outer sleeve) and may constitute a thermal bridge between the external environment of the double pipe and the inner tube. Right at each arrestor, this thermal bridge may create a cold spot which results in the formation of paraffin wax. To avoid this problem, a thermal insulation based on a ceramic may be created between the insulated parts of the double pipes.

For this purpose, the partition 11, (FIGS. 5 and 6) may be made of ceramic and the sleeves 12 and 14 of steel. The partition may be adhesively bonded to the tubes with an anaerobic adhesive which ensures leaktightness. The embodiment in FIG. 5 has retained a steel thread 18 engaging with the thread 13 of the inner sleeve 14, whereas in the embodiment in FIG. 6 the arrestor 10 is made as one piece by directly bonding the partition 11 to the sleeves 12 and 14. The thermal conductivity of the ceramic must be less than 0.5 W/K.m and preferably less than 0.2 W/Km.

FIG. 7 shows two alternative forms of the embodiment in FIG. 1. The upper part of the figure shows the case in which the partition 11 is welded directly to the sleeves, respectively the outer sleeve 12 and inner sleeve 14 (or even to the tubes themselves) and the lower part of the figure shows the case in which the entire device 10 is produced as a casting which includes the sleeves 12, 14 and the partition 11. However, these two embodiments do not allow the advantageous fitting as in FIGS. 2 to 4 and require the use of an intermediate linking piece, generally consisting of two half-shells, which will entail additional welds, namely two longitudinal welds and one circumferential weld.

What is claimed is:

1. An underwater system to transport hydrocarbons, comprising:
    a plurality of pipe sections, each pipe section being comprised of an inner tube and an outer tube surrounding and spaced outwardly from the inner tube so that an annular space is formed between the outer and inner tubes; and
    a plurality of coupling devices to connect coaxial adjacent pipe sections, at least one of the coupling devices being comprised of:
        a linear inner sleeve fastened between the inner tubes of the adjacent pipe sections, the inner sleeve having a mid-portion;
        a linear outer sleeve fastened between the outer tubes of the adjacent pipe sections, the outer sleeve having a mid-portion; and
        a rigid transverse annular partition extending completely across the annular space and connected to the mid-portions of the inner and outer sleeves, with the partition and at least one of the sleeves being threadably connected.
2. The piping system of claim 1, wherein the outer and inner sleeves are formed of metal and are respectively fastened to the outer and inner tubes of the coaxial adjacent pipe sections by welding.
3. The piping system of claim 1, wherein the outer and inner sleeves are respectively fastened to the outer and inner tubes of the coaxial adjacent pipe sections by welding.

4. The piping system of claim 1, wherein the outer sleeves of the coupling devices have outer diameters that are the same as outer diameters of the outer tubes of the coaxial adjacent pipe sections.

5. The piping system of claim 4, wherein the partition has an axial dimension less than 0.5 times the outer diameters of the outer tubes.

6. The piping system of claim 5, wherein the partition has an axial dimension less than 0.2 times the outer diameters of the outer tubes.

7. The piping system of claim 1, wherein the inner sleeves of the coupling devices have outer diameters that are the same as outer diameters of the inner tubes of the coaxial adjacent pipe sections.

8. The piping system of claim 1, wherein the inner and outer sleeves of the coupling devices are axially offset from one another.

9. The piping system of claim 1, wherein the partition is formed of a material that is mechanically strong and thermally poorly conductive.

10. The piping system of claim 1, wherein the partition is formed of a ceramic material.

11. The piping system of claim 1, wherein each of the inner sleeves includes two ends and a wall, the wall having a first thicknesses in an area of the mid-portion of the inner sleeve and a second thickness in an area of the ends of the inner sleeve, the first thickness being greater than the second thickness.

12. The piping system of claim 11, wherein the wall includes a third thickness that increases gradually from the second thickness to the first thickness.

* * * * *